United States Patent [19]

Majerus

[11] Patent Number: 4,857,122
[45] Date of Patent: Aug. 15, 1989

[54] PROCESS FOR INJECTION MOLDING TIRE TREADS

[75] Inventor: Norbert Majerus, Akron, Ohio

[73] Assignee: The Goodyear Tire & Rubber Company, Akron, Ohio

[21] Appl. No.: 248,607

[22] Filed: Sep. 26, 1988

Related U.S. Application Data

[62] Division of Ser. No. 37,509, Apr. 13, 1987, Pat. No. 4,795,329.

[51] Int. Cl.$^4$ .................. B29C 45/00; B29C 35/02
[52] U.S. Cl. .................. 156/125; 156/242; 156/312; 264/315; 264/328.13; 264/328.3
[58] Field of Search ............ 264/258, 279, 315, 326, 264/328.3, 328.13, 328.7, 328.8, 236, ; 156/513, 529, 242, 125, 312

[56] References Cited

U.S. PATENT DOCUMENTS

| | | | |
|---|---|---|---|
| 2,724,425 | 11/1955 | Ostling | 425/582 |
| 2,744,290 | 5/1956 | Corson | 425/582 |
| 4,055,619 | 10/1977 | Goodfellow | 264/258 |
| 4,059,375 | 11/1977 | Koch et al. | 425/589 |
| 4,088,523 | 5/1978 | Gallizia et al. | 156/125 |
| 4,166,832 | 9/1979 | Gallizia | 264/279 |
| 4,176,702 | 12/1979 | Seiberling | 152/209 |
| 4,604,256 | 8/1986 | Greenwood et al. | 264/501 |
| 4,655,699 | 4/1987 | Collier | 425/28 R |

FOREIGN PATENT DOCUMENTS

| | | | |
|---|---|---|---|
| 0007702 | 1/1982 | Japan | 264/315 |
| 0887255 | 12/1981 | U.S.S.R. | 264/315 |

Primary Examiner—Willard Hoag
Attorney, Agent, or Firm—Frederick K. Lacher; T. P. Lewandowski

[57] ABSTRACT

A viscoelastic fluid molding material is injected into a tire tread cavity between the mold and an inflatable tread supporting body. The clearance distance between the mold and the inflatable tread supporting body is varied to increase the flow of the initial amount of fluid molding material into remote portions of the tire tread cavity and provide for the flow of the final amount of fluid molding material into gate portions while the tread supporting body is being deflected.

Circumferentially spaced gates may be spaced from the centerplane of the mold and have runners extending toward the shoulders of the tread supporting body for increased flow of the initial amount of fluid molding material into remote shoulder portions of the tread cavity. Sealing rings at the side edges of the tread cavity prevent flow of fluid molding material into sidewall areas of side members of the mold.

13 Claims, 9 Drawing Sheets

PROCESS FOR INJECTION MOLDING TIRE TREADS

This is a division of application Ser. No. 037,509, filed Apr. 13, 1987, now U.S. Pat. No. 4,795,329.

This application relates to injection molding of the tread on an inflatable tread supporting body such as a tire casing. Heretofore processes and apparatus have been proposed to inject a viscoelastic, fluid molding material such as rubber into a tire tread cavity between a mold and an inflatable, tread supporting body. One of the problems has been to obtain even distribution of the fluid molding material throughout the tread cavity.

It has been found that the first viscoelastic fluid molding material injected through inlet gates will fill the space adjacent the gates and this makes it difficult to push that material toward the spaces remote from the gates. As a result, injected treads have had a thickness greater than desired adjacent the gates and less than desired at positions remote from the gates. The problem is especially prevalent where the inlet gates are at the shoulders or at the centerplane of the mold. At the shoulders, the fluid molding material has also been injected between the sidewall of the tread supporting body and the molding surface which is not desirable especially where the tread is applied on a tire casing.

The present invention provides a process and apparatus in which the tire tread mold has a reverse contour shape to provide a reduced clearance between the mold and the inflatable tread supporting body at the gate portions of the tire tread cavity. During injection of the viscoelastic, fluid molding material the remote portions of the tire tread cavity are filled before the gate portions. Then the surface of the inflatable tread supporting body adjacent the gates is deflected to provide the desired clearance distance to fill the gate portions and thereby distribute the fluid molding material so that the desired tread contour and thickness is obtained.

When the inlet gates are at the centerplane of the mold or at the side edges, secondary gates may be provided in accordance with this invention at positions between the centerplane and the shoulder of the mold and have runners extending toward the shoulders or centerplane of the mold. The use of the secondary gates is especially desirable to improve the distribution of higher viscosity materials.

The desired distribution of the viscoelastic, fluid molding material is provided during injection with a relatively low pressure in the inflatable, tread supporting body. Then after injection of the complete tread, the pressure in the tread supporting body is increased to smooth out the tread surfaces and provide the desired curing pressure for the injected fluid molding material.

In accordance with an aspect of the invention there is provided a tread mold for injection molding a tread on a radially outer surface of an inflated, flexible annular body positioned in the mold with the radially outer surface spaced from a tread molding surface of the mold to form a tire tread cavity, a plurality of circumferentially spaced-apart gates in the mold in communication with the tire tread cavity providing gate portions around the cavity, means for injecting a viscoelastic fluid molding material into the gate portions of the tread cavity through the gates and into remote portions of the tire tread cavity spaced axially of the flexible annular body from the gates, means to regulate the flow of the fluid molding material to the gate portions and the remote portions of the tire tread cavity, means to inflate the flexible annular body at a relatively low pressure during the injection of the fluid molding material to permit the distribution of predetermined amounts of the fluid molding material around the cavity and means to increase the pressure in the flexible annular body to a high pressure during curing of the fluid molding material on the radially outer surface of the flexible annular body in the tire tread cavity.

In accordance with another aspect of the invention there is provided a method of injecting a tread on an inflated flexible annular body positioned in a mold with a radially outer surface of the flexible annular body spaced from a tread molding surface of the mold to form a tire tread cavity comprising:

(a) inflating the flexible annular body to a low pressure;

(b) injecting a fluid molding material into the cavity at circumferentially spaced positions around the mold;

(c) regulating the flow of the fluid molding material;

(d) inflating the flexible annular body to a substantially high pressure after the molding material is injected;

(e) heating the fluid molding material in the tire tread cavity to vulcanize the material;

(f) reducing the pressure in the flexible annular body;

(g) opening the mold; and (h) removing the flexible annular body and the tread from the mold.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figure 1:
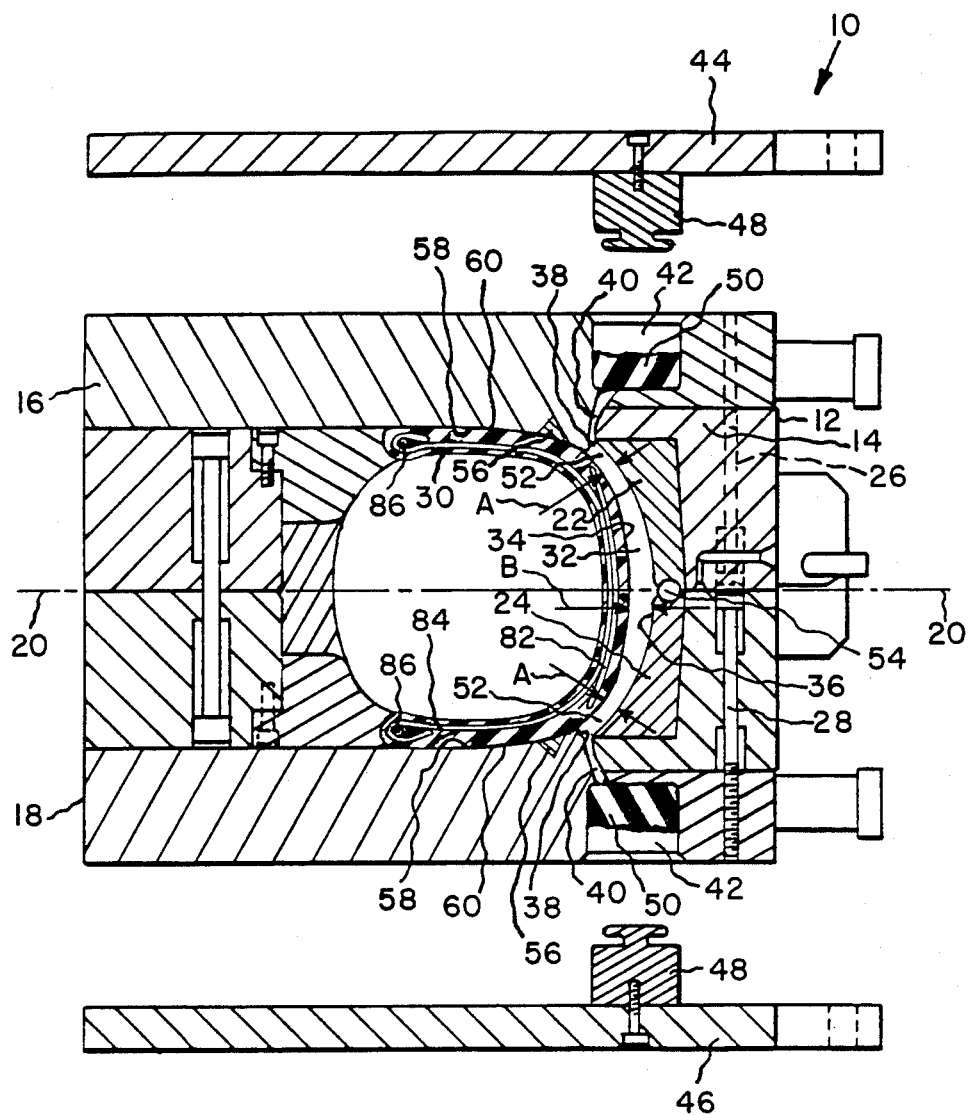
FIG. 1 is a radial section of one-half of a mold for injection molding a tread on a tire casing showing the casing located in the mold and the fluid molding compound in the transfer recesses before closing the mold and injection of the molding compound by the squeeze rings.
Figure 2:
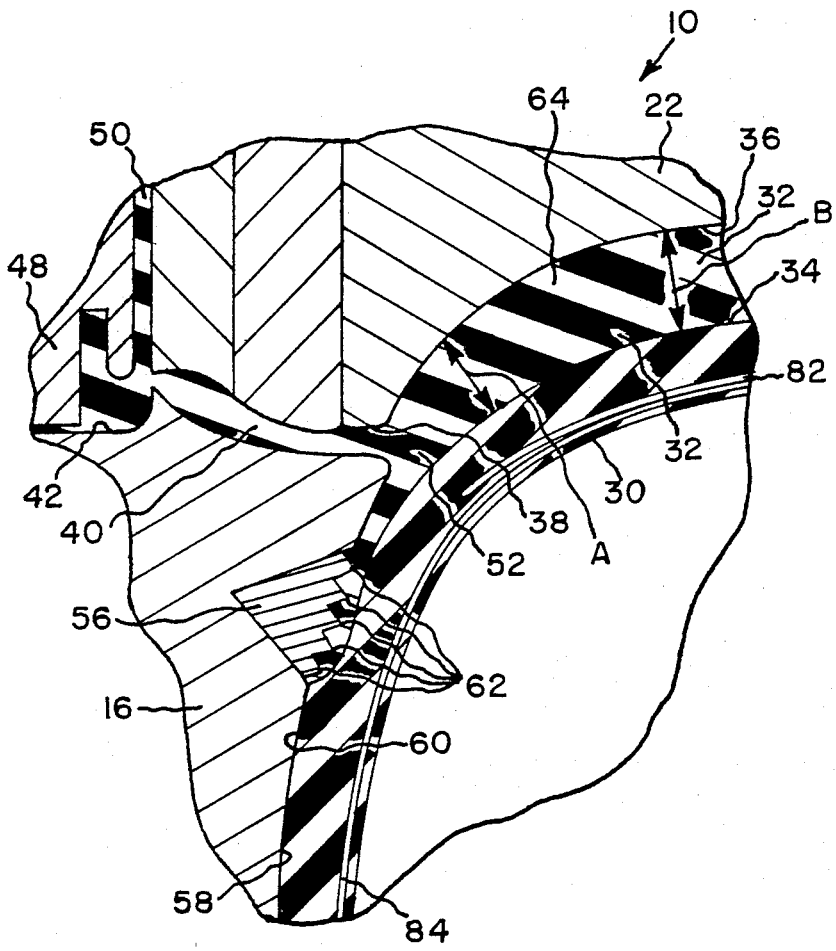
FIG. 2 is an enlarged fragmentary sectional view of a shoulder gate portion of the mold shown in FIG. 1 showing the tread after injection into the tread cavity with the tire casing deflected and the flow of the fluid molding material into the sidewall prevented by the sealing ring.
Figure 3:
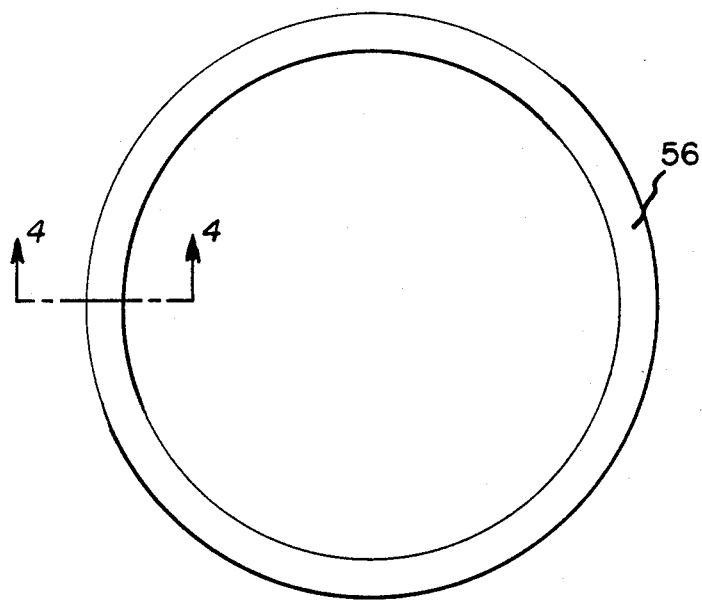
FIG. 3 is a plan view of one of the sealing rings.
Figure 5:
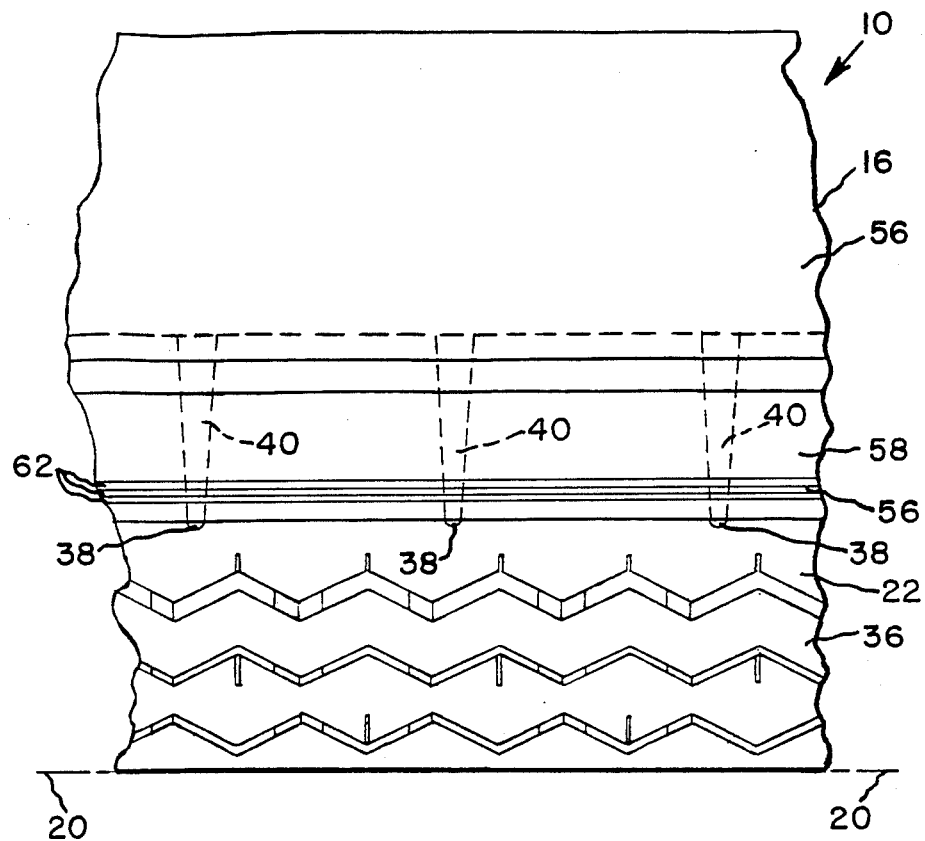
FIG. 5 is a fragmentary radial view of the molding surface of the tread molding ring shown in FIG. 1 with the tire casing removed showing the positions of the inlet gates in full lines and the runners in dotted lines.

Referring to FIGS. 1, 2 and 5, a tread mold 10 is shown having a mold casing 12 including a tread molding ring member 14, a first annular side member 16 and a second annular side member 18. The tread molding ring member 14 may be split at the parting line or centerplane 20-20 of the mold 10 into a first ring section 22 and a second ring section 24. Suitable means for supporting the first ring section 22 and second ring section 24 may include bolts 26 and 28, respectively, threaded in the first annular side member 16 and second annular side member 18 at circumferentially spaced positions and slidably engaging the first ring section and second ring section.

The mold 10 may contain an inflatable, flexible annular body such as a tire casing 30. A tire tread cavity 32 is formed between a radially outer surface 34 of the tire casing 30 and a tread molding surface 36 of the first ring section 22 and second ring section 24 of the tread molding ring member 14. Circumferentially spaced shoulder gates 38 are positioned at the edges of the first ring section 22 and second ring section 24 at the shoulders of the mold 10. Side member runner passages 40, which may be tapered, are in communication with the shoulder gates 38 and annular transfer recesses 42 in the side members 16 and 18 of the tread mold 10.

Outward of the first annular side member 16 and second annular side member 18 are a first plate member 44 and a second plate member 46 having squeeze rings 48 movable into the annular transfer recesses 42. The squeeze rings 48 eject a viscoelastic fluid molding material such as tread rubber 50 from the recesses 42 through the side member runner passages 40 and the shoulder gates 38 into gate portions such as shoulder portions 52 of the tire tread cavity 32.

In accordance with this invention, the tread molding surface 36 is shaped to provide a clearance distance A between the tread molding surface 36 and the radially outer surface 34 of the tire casing 30 at the shoulder portions 52 which is less than the clearance distance B at the remote portions of the tire tread cavity 32 with the tire inflated to a low pressure such as 30 psi (2.11 kg/cm$^2$). In the embodiment shown, the clearance distance A at the shoulder portions 52 is 0.62 inches (1.58 cm) and the clearance distance B at the remote portions is 0.25 inches (0.64 cm).

An annular recess 54 may be provided at the mating surfaces of the first and second ring sections 22 and 24 and have annular passages in communication with the tire tread cavity 32 to accommodate overflow from the innerface portion of the tread rubber 50. Vacuum means may also be in communication with the annular recess 54 to facilitate filling of the tire tread cavity 32 and filling of the recess overflow from the innerface portion.

Figure 4:
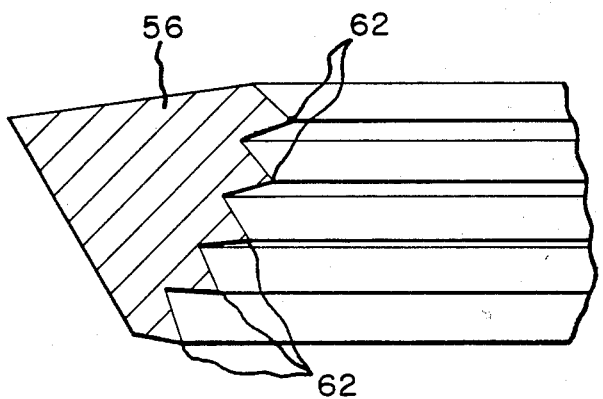
FIG. 4 is a sectional view of the sealing ring taken along line 4—4 in FIG. 3.

Sealing rings 56 may be mounted in molding faces 58 of the first annular side member 16 and second annular side member 18 for preventing flow of the tread rubber 50 from the tire tread cavity 32 into a sidewall area 60 at each side of the tire casing 30. As shown in FIGS. 2 and 4, each of the sealing rings 56 may have a plurality of circumferentially extending ribs 62 in side-by-side relationship providing a labyrinth-type seal which not only prevents flow of the tread rubber 50 beyond the ribs but molds a finishing margin at the edge of a tread 64 as shown in FIG. 2.

In operation, the tire casing 30 may be conditioned prior to placing in the mold 10 by heating the casing in a hothouse at about 180° F. (82.2° C.). A suitable adhesive or suitable antisticking compound may be applied to the radially outer surface 34 of the tire casing 30 depending upon whether it is desired to adhere the tread 64 to the casing or strip the tread from the casing after removal from the mold 10. The tire casing 30 may then be placed in the mold 10 with or without a bladder, curing bag or other inflatable member. The mold may then be closed so that the casing can be inflated to a low pressure of about 30 psi (2.11 kg/cm$^2$). A predetermined quantity of tread rubber 50 is placed in each of the transfer recesses 42 and may be preheated to a temperature of from about 120° F. to 260° F. (48.9° C. to 126.7° C.). In this embodiment, a pressure of about 1,000 tons is applied to the first plate member 44 and second plate member 46 for ejecting the tread rubber 50 from the transfer recesses 42 through the side member runner passages 40 and shoulder gates 38 into the tire tread cavity 32. The high pressure transfer molding at the required pressures of around 5,000 psi (351.5 kg/cm$^2$) and high temperatures of around 200° F. to 250° F. (93.3° C. to 121.1° C.) causes the rapid injection of the tread rubber 50 into the tire tread cavity 32. Preferably the mold 10 is heated to a temperature of about 300° F. to 350° F. (148.9° C. to 176.7° C.). The tread rubber 50 is preferably a viscoelastic material which may be of natural or synthetic reinforced rubber of a type used for tire treads. The tread rubber 50 has a relatively high Mooney viscosity of over 10 and preferably between 20 and 50 as measured in accordance with ASTM standard method of test D 1646 on a Mooney shearing disc viscometer using a small disc.

During the initial injection, the tread rubber 50 is injected into the shoulder portions 52 where the clearance distance A at the gate portions is less than the clearance distance B at the remote portions spaced from the shoulder gates 38 of the mold 10. Because the clearance distance A at the shoulder portions 52 is less than the clearance distance B at the remote portions, the remote portions can be filled through the shoulder portions 52. After the remote portions are filled, the additional tread rubber 50 injected into the tire tread cavity 32 causes the radially outer surface 34 of the tire casing 30 to be deflected to a position such as that shown in FIG. 2 where the clearance distance A at the shoulder portions 52 is increased to the desired amount which may be the same as the clearance distance B at the remote portions of the tire tread cavity 32. After the prescribed amount of tread rubber 50 has been injected into the tire tread cavity 32, the first plate member 44 and second plate member 46 will abut the first annular side member 16 and second annular side member 18. The pressure in the tire casing 30 is then increased to a high pressure of about 200 psi (14.06 kg/cm²). This pressure will provide the desired curing pressure and smooth out the tread rubber 50 which has been substantially evenly distributed along the radially outer surface 34 of the tire casing.

The pressure in the tire casing 30 may be raised to 100 psi (7.03 kg/cm²) prior to injection of the tread rubber 50 to seat the beads of the tire casing 30 and then lowered. Tire casing inflation bumping cycles and other variations in inflation pressures may be practiced to assist the escape of air from the mold 10 and facilitate the flow of the tread rubber 50. Also bumping of the mold may be employed to smooth out the tread rubber 50 on the casing 30 by varying the pressure plus or minus 10 psi (0.7 kg/cm²).

After the tread 64 is molded on the tire casing 30 and at least partial curing has occurred in the mold 10, the mold may be opened by separating the first annular side member 16 and the second annular side member 18. During this separation, the first ring section 22 and the second ring section 24 may be pulled away from the first side member 16 and second side member 18 a predetermined distance. After the first ring section 22 and second ring section 24 are pulled away from the first side member 16 and second side member 18, the first ring section and second ring section are separated. The tire casing 30 may then be removed along with the tread 64 attached thereto. The tread 64 may be adhered to the radially outer surface 34 of the tire casing 30 in which case the tire is ready for use. Where an antistick material has been applied to the radially outer surface 34, the tread 64 may be stripped off the tire casing 30 and used for retreading another tire. During the opening of the mold 10, the tread rubber 50 not injected into the tire tread cavity 32 and which is remaining in the side member runner passages 40 and transfer recesses 42 may be removed. The mold 10 will then be ready for molding another tread 64 on another tire casing 30.

The injection molding described hereinabove is also referred to as "transfer molding". It is clear, however, that the invention may be practiced by injecting the fluid molding material or tread rubber 50 directly from an injection molding machine. "Injection-transfer" molding may also be utilized where the fluid molding material or tread rubber 50 is injected into the transfer recesses 42 and then transferred by the squeeze rings 48 into the tire tread cavity 32.

Before the mold 10 is opened, the high pressure exerted on the tread rubber 50 is released as by retraction of the first plate member 44 and second plate member 46 from the first annular side member 16 and second annular side member 18. Also before opening the mold to remove the tire casing 30, the inflation pressure within the tire casing is released so there is no danger of injury to the operator. Suitable safety controls may be used to prevent opening of the mold when there is pressure applied by the injection molding material or pressure in the tire casing 30.

Figure 6:
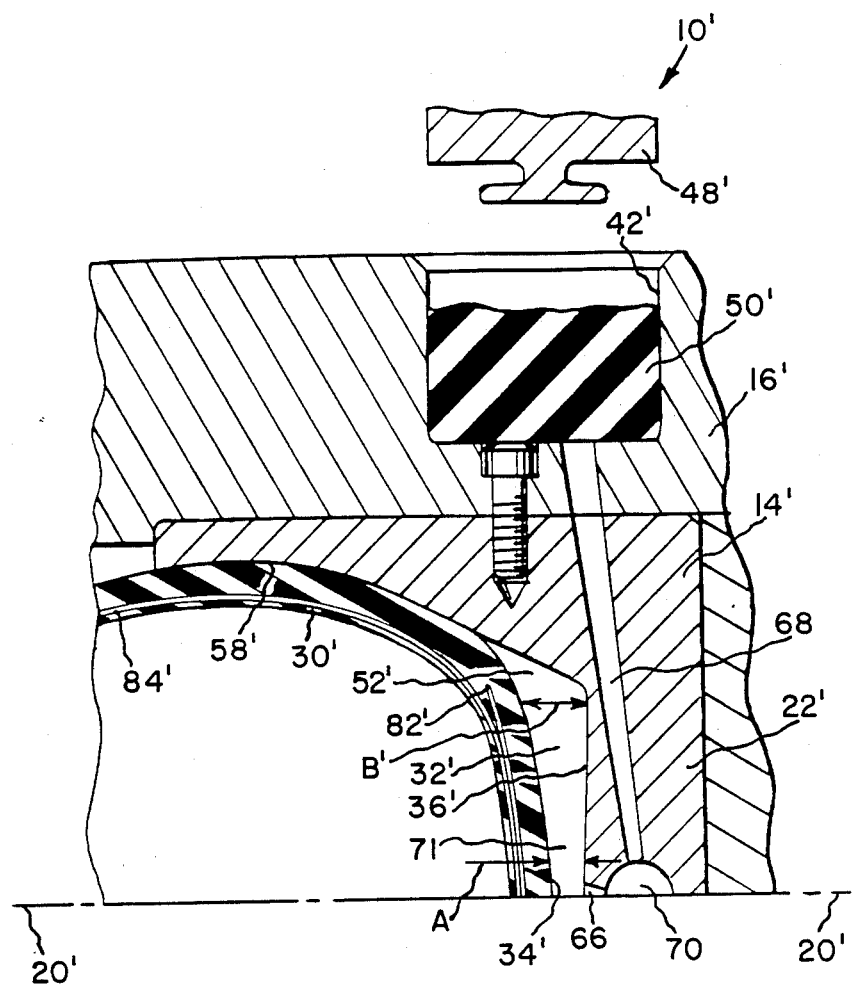
FIG. 6 is a fragmentary, radial section of one-half of an upper mold section of a mold embodying the invention in which an inlet gate is at the centerplane of the mold showing the casing located in the mold with the fluid molding compound in the transfer recess before closing the mold and injection of the molding compound by the squeeze ring.
Figure 7:
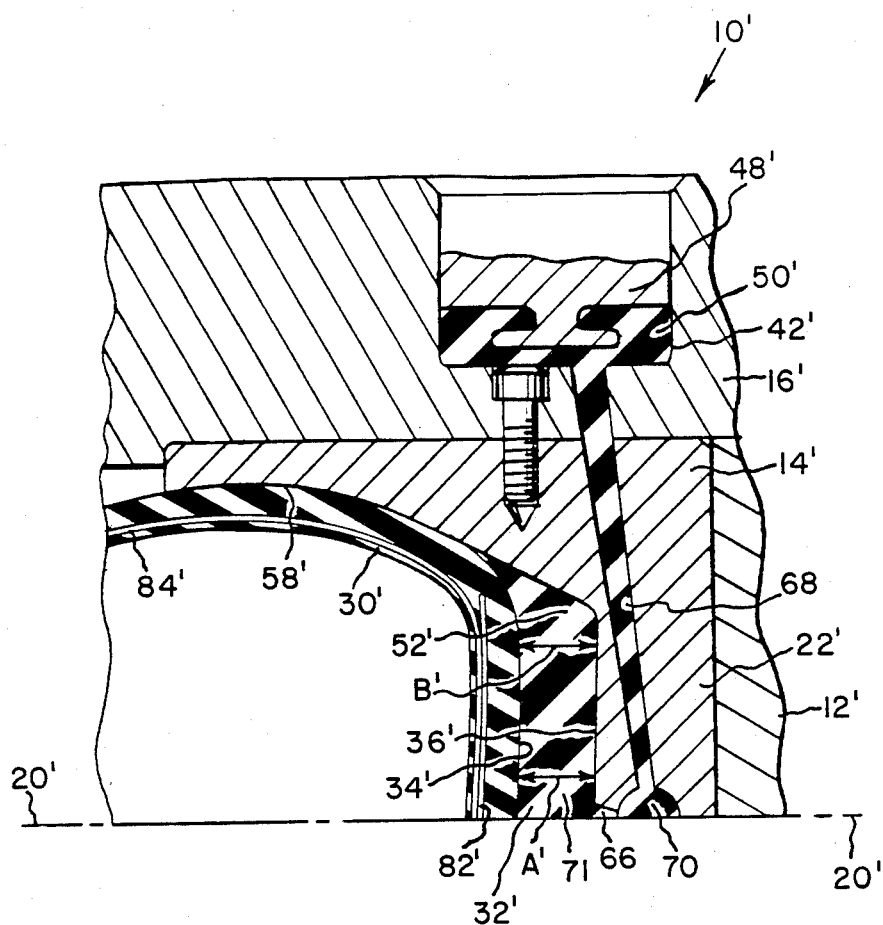
FIG. 7 is a view like FIG. 6 showing the tire casing in the deflected condition after injection of the fluid molding compound into the tread cavity.
Figure 8:
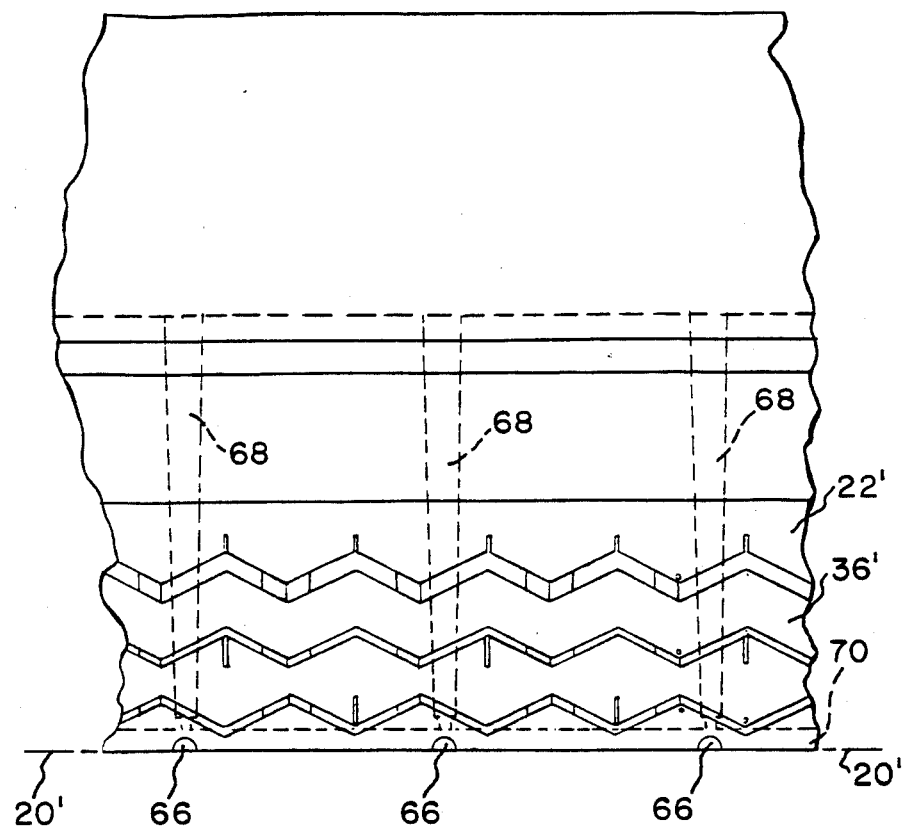
FIG. 8 is a fragmentary, radial view of the molding surface of the tread molding ring shown in FIG. 6 with the tire casing removed showing the positions of the inlet gates in full lines and the runners in dotted lines.

With reference to FIGS. 6, 7 and 8, a modification is shown in which the mold 10' has a tread molding ring member with centerplane gates 66 circumferentially spaced around the tire tread cavity 32' at the centerplane 20'-20' of the tread molding ring member 14'. In the drawings, only the first ring section 22' of the tread molding ring member 14' is shown; however, the second ring section 24' will have the same clearance distances A' and B' as described for the first ring section. The second annular side member 18', which is not shown, will also have the same construction as that described and shown for the first annular side member 16'. The squeeze ring 48' for the transfer recess 42' in the first annular side member 16' will have the same construction as the corresponding parts for the second annular side member 18' which is not shown. A plurality of tapered runner passages 68 extend axially from the recess 42' to a center runner 70 in communication with the tire tread cavity 32' through the centerplane gates 66. It is understood that with this construction only the transfer recess 42' in the first annular side member 16' may be necessary to inject the tread rubber 50' through the runner passage 68 in the first ring section 22'. In that event, there would be no transfer recess in the second annular side member 18' or a squeeze ring 48' on the second plate member 46'.

In accordance with this invention, the tread molding surface 36' is formed so that the clearance distance A' at the gate or centerplane portion 71 is less than the clearance B' at the remote or shoulder portions 52'. Then, as shown in FIG. 7, when the tread rubber 50' is ejected from the recesses 42' through the runner passages 68 into the center runner 70 and through the centerplane gates 66 into the tire tread cavity 32', the flow of the tread rubber 50' into the remote or shoulder portions 52' will be facilitated during injection of an initial amount of the tread rubber. The flow of the tread rubber 50' into the centerplane portion 71 will b increased during injection of a final amount of the tread rubber causing the radially outer surface 34' of the tire casing 30' to be deflected after a predetermined amount of tread rubber has been injected into the tire tread cavity 32'. In this way, the tread rubber 50' is evenly distributed to provide the desired tread contour and thickness. The curing of the tread rubber 50' in the cavity 32' may be accomplished in the same manner as described for the embodiment of FIGS. 1 through 5.

Figure 9:
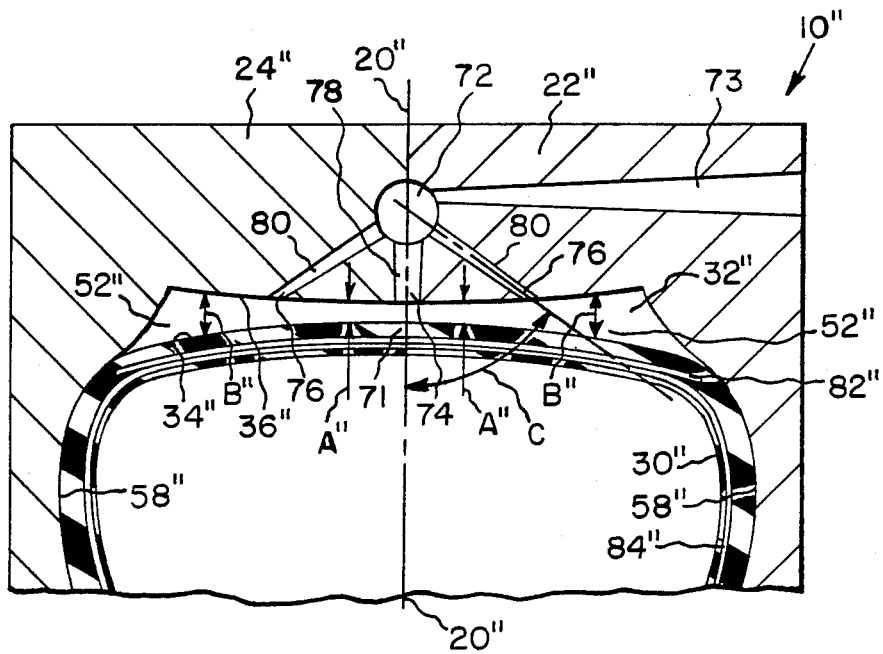
FIG. 9 is a radial section of one-half of another mold embodying the invention showing the tire casing located in the mold prior to injection of the fluid molding compound into the tread cavity.
Figure 10:
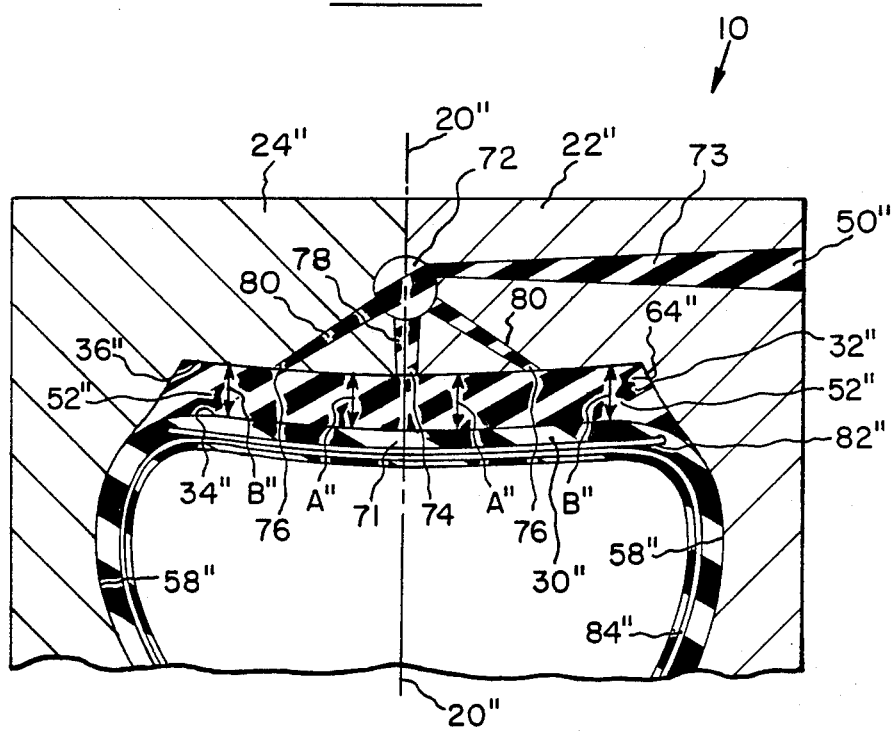
FIG. 10 is a radial section like FIG. 9 showing the tread after injection into the tread cavity with the tire casing deflected.
Figure 11:
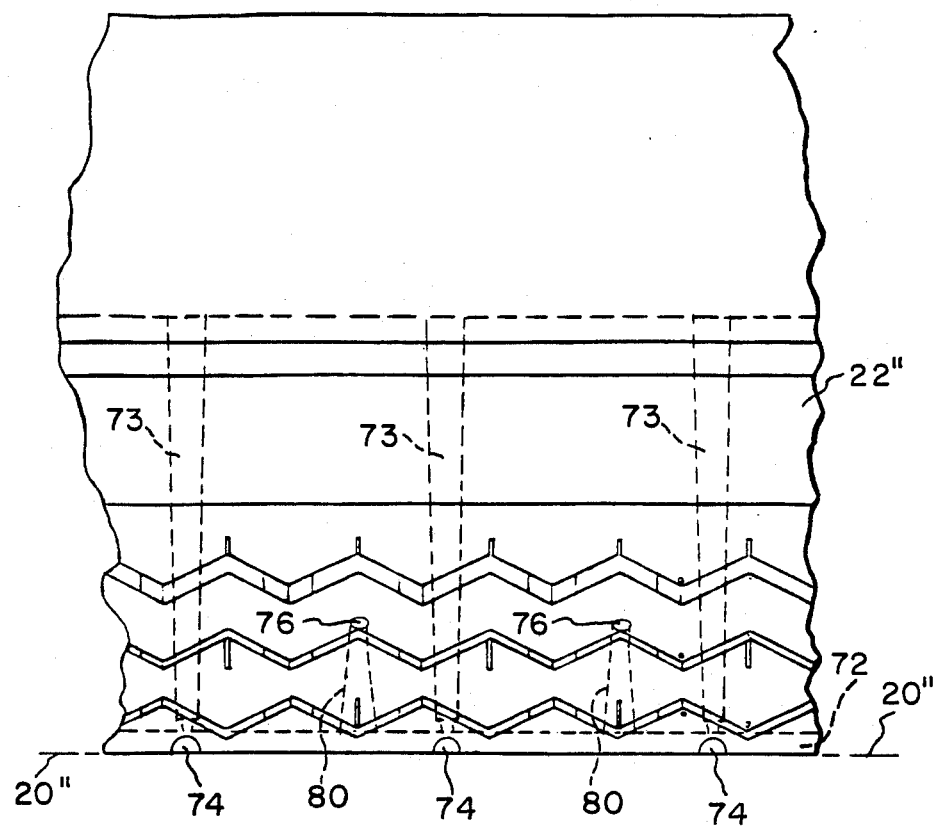
FIG. 11 is a fragmentary, radial view of the molding surface of the tread molding ring shown in FIG. 9 with the tire casing removed showing the positions of the runners in dotted lines and the inlet gates in full lines.

Referring to FIGS. 9, 10 and 11, a further modification is shown in which the tread rubber 50" is communicated to an annular channel 72 extending around the outer periphery of the first ring section 22" and second ring section 24" through a plurality of circumferentially spaced, axially extending tapered runners 73. The gates for communicating the tread rubber 50" to the tire tread cavity 32" from the annular channel 72 include circumferentially spaced center gates 74 at the centerplane 20"-20" and secondary intermediate side gates 76 circumferentially spaced from and on opposite sides of the center gates. Radially extending centerplane runners 78 connect the annular channel 72 and the center gates 74. The side gates 76 are spaced from the centerplane 20"-20" so that side gate runners 80 are sloped at an angle C relative to the centerplane. Preferably the angle C is generally tangential to the radially outer surface 34" of the tire casing 30" at the shoulder portions 52" prior to injection of the tread rubber 50" into the tire tread cavity 32".

Secondary side gates similar to side gates 76 may also be used with molds 10, shown in FIGS. 1 through 5, with runners in communication with the transfer recesses 42. This improves the distribution of the tread rubber 50 and the modification of the tread molding surface 36 may be minimized.

Referring to FIG. 9, the clearance distance A" at the centerplane portion 71" adjacent the center gates 74 and side gates 76 is less than the clearance distance B" at the shoulder portions 52" of the tire tread cavity 32" adjacent the shoulders of the mold 10". Then upon injection of the tread rubber 50" in a manner described for the modifications of FIGS. 1 through 8, the flow of tread rubber to the shoulder portions 52" is facilitated during injection of an initial amount of the tread rubber and the flow of the tread rubber injected into the centerplane portion 71" adjacent the centerplane 20"-20" is increased during injection of a final amount of the tread rubber. The tire casing 30" at the centerplane 20"-20" is then deflected as shown in FIG. 10 so that the tire tread cavity 32" is filled with tread rubber 50" which is distributed to achieve the desired tread contour. The curing of the tread rubber 50" in the cavity 32" may then be accomplished in the same manner as described for the embodiment of FIGS. 1 through 5.

The tire casings 30, 30' and 30" shown in the drawings may be buffed casings of uncured, partially cured, or precured radial tires which have circumferentially extending belts 82, 82' and 82" shown in FIGS. 1, 6 and 9. Radial plies 84, 84' and 84" underlie the belts 82, 82' and 82" and extend between beads 86, such as those shown in FIG. 1. The substantially circumferential cords of the belts 82, 82' and 82" contribute to the desired circumferential and radial distribution of the tread rubber 50, 50' and 50" during injection and before curing. At the high inflation pressure of 200 psi (14.06 kg/cm $^2$) the edges of the belts 82, 82' and 82" may be lifted; however, after the treads 64, 64' and 64" are cured and the tire casings 30, 30' and 30" removed from the molds 10, 10' and 10" the belts will contract at the edges and provide generally flat tread contours with the tire casings inflated to a normal 90 psi (6.33 kg/cm $^2$) for a truck tire. Tires having other reinforcing systems, such as bias ply tires, may also be used with the molds 10, 10' and 10" of this invention.

During injection of the tread rubber 50, 50' and 50" into the tire tread cavities 32, 32' and 32", it is important that the tire casings 30, 30' and 30" are inflated to position the cords of the belts 82, 82' and 82" and plies 84, 84' and 84" in the desired locations relative to the tread cavities. The cords of the radial plies 84, 84' and 84" do have the flexibility to conform to the different molding faces 58, 58' and 58" of the side members and the reverse contour of the tread molding surfaces 36, 36' and 36" during the injection process to provide the desired distribution of the tread rubber 50, 50' and 50". Then after removal of the tire casings 30, 30' and 30" from the molds 20, 20' and 10" with the treads 64, 64' and 64", the radial cords of the radial plies 84, 84' and 84" along with the circumferential cords of the belts 82, 82' and 82" maintain the desired shapes of the tires in operation.

While certain representative embodiments and details have been shown for the purpose of illustrating the invention, it will be apparent to those skilled in the art that various other changes and modifications may be made therein without departing from the spirit or scope of the invention.

What is claimed is:

1. A method of injecting a tread on an inflated flexible annular body positioned in a mold with a radially outer surface of said flexible annular body spaced from a tread molding surface of said mold to form a tire tread cavity comprising:
   (a) inflating said flexible annular body to a first pressure;
   (b) injecting a fluid molding material into said cavity at circumferentially spaced positions around said mold;
   (c) regulating the flow of said fluid molding material;
   (d) inflating said flexible annular body to a second pressure substantially higher than said first pressure after said molding material is injected;
   (e) heating said fluid molding material in said tire tread cavity to vulcanize said material;
   (f) reducing said pressure in said flexible annular body;
   (g) opening said mold; and
   (h) removing said flexible annular body and said tread from said mold.

2. The method of claim 17 wherein said first pressure is about 30 psi (2.11 kg/cm $^2$) and said second pressure is about 200 psi (14,06 kg/cm $^2$).

3. The method of claim 1 wherein said flexible annular body is a tire casing having a belt of circumferentially extending reinforcing cords to restrict the expansion of said tire casing during inflation at said first pressure and control the expansion of said tire casing during inflation at said second high pressure.

4. The method of claim 1 wherein said flexible annular body is a tire casing having a pair of annular bead rings and radially extending reinforcing cords between said annular bead rings.

5. The method of claim 1 wherein said fluid molding material is adhered to said radially outer surface of said flexible annular body during heating of said material in said tire tread cavity.

6. The method of claim 1 further comprising coating said radially outer surface of said flexible annular body with an antistick material prior to positioning said flexible annular body in said mold and stripping of said tread from said flexible annular body after removal from said mold.

7. The method of claim 1 wherein said fluid molding material has a high viscosity during injection into said tire tread cavity.

8. The method of claim 7 wherein said high viscosity is between 20 and 50 as measured in accordance with ASTM Standard Method of test D 1646 on a Mooney shearing disc viscometer using a small disc.

9. The method of claim 17 wherein the flow of said fluid molding material is regulated by injection through a plurality of circumferentially spaced gates in said mold into gate portions of said tread cavity adjacent said gates and then into remote portions spaced from said gates with the flow of said fluid molding material into said remote portions being facilitated during injection of an initial amount of said molding material and the flow of said molding material into said gate portions being increased during injection of a final amount of said molding material causing a radially outer surface of said flexible annular body at said gate portions of said cavity to be deflected and thereby provide the desired distribution of said fluid molding material over said remote portions and said gate portions of said tire tread cavity.

10. The method of claim 9 wherein regulation of the flow of said fluid molding material comprises providing clearance distances between said tread molding surface and said radially outer surface of said flexible annular body to control the flow of said fluid molding material from said gates through said gate portions to said remote portions and locating mold surfaces in said mold to provide clearance distances at said gate portions less than the clearance distances at said remote portions during injection of an initial amount of said fluid molding material and then deflecting said radially outer surface of said flexible annular body to increase said clearance distances at said gate portions during injection of said final amount of said fluid molding material into said tire tread cavity.

11. The method of claim 10 further comprising spacing said gate portions axially from said remote portions of said tread cavity to provide radial movement of said radially outer surface of said flexible annular body at said gate portions during injection of said fluid molding material into said tire tread cavity.

12. The method of claim 11 wherein said flexible annular body is a tire casing further comprising locating said gate portions at shoulders of said tire casing, locating said remote portions at the centerplane of said mold and deflecting said radially outer surface of said tire casing at shoulders of said tire casing during injection of said final amount of fluid molding material into said tread cavity.

13. The method of claim 11 wherein said flexible annular body is a tire casing, further comprising locating said gate portions around a centerplane of said mold, locating said remote portions at shoulders of said tire casing and deflecting said radially outer surface of said tire casing around said centerplane of said mold during injection of said final amount of said fluid molding material into said tread cavity.

* * * * *